US012700771B1

(12) United States Patent
Shaw et al.

(10) Patent No.: US 12,700,771 B1
(45) Date of Patent: Aug. 4, 2026

(54) AXIAL FLUX ACTUATORS USING PRINTED CIRCUIT BOARD ARMATURES

(71) Applicant: E-Circuit Motors, Inc., Needham Heights, MA (US)

(72) Inventors: Steven Robert Shaw, Bozeman, MT (US); George Harder Milheim, Bozeman, MT (US); Ryan Terrence Duffy, Burlington, MA (US)

(73) Assignee: E-Circuit Motors, Inc., Needham Heights, MA (US)

( * ) Notice: Subject to any disclaimer, the term of this patent is extended or adjusted under 35 U.S.C. 154(b) by 0 days.

(21) Appl. No.: 19/324,325

(22) Filed: Sep. 10, 2025

Related U.S. Application Data

(60) Provisional application No. 63/804,753, filed on May 13, 2025.

(51) Int. Cl.
| | |
|---|---|
| *H02K 7/14* | (2006.01) |
| *H02K 1/06* | (2006.01) |
| *H02K 1/2793* | (2022.01) |
| *H02K 3/26* | (2006.01) |
| *H02K 7/08* | (2006.01) |
| *H02K 16/04* | (2006.01) |
| *H02K 23/54* | (2006.01) |
(Continued)

(52) U.S. Cl.
CPC .................. *H02K 7/14* (2013.01); *H02K 1/06* (2013.01); *H02K 1/2793* (2013.01); *H02K 3/26* (2013.01); *H02K 7/08* (2013.01); *H02K 16/04* (2013.01); *H02K 23/54* (2013.01);

*H02K 41/0358* (2013.01); *H02K 21/24* (2013.01); *H02K 41/00* (2013.01); *H02K 2201/15* (2013.01)

(58) Field of Classification Search
CPC ............... H02K 41/00; H02K 41/0358; H02K 2201/15; H02K 16/04; H02K 23/54; H02K 7/14; H02K 3/26; H02K 1/2793; H02K 2203/03
See application file for complete search history.

(56) References Cited

U.S. PATENT DOCUMENTS

| | | | | | |
|---|---|---|---|---|---|
| 3,924,146 | A | * | 12/1975 | George | .............. H02K 41/0358 310/12.08 |
| 4,544,972 | A | * | 10/1985 | Kogure | .............. H02K 41/0358 360/246.7 |

(Continued)

FOREIGN PATENT DOCUMENTS

| | | | | |
|---|---|---|---|---|
| CN | 119519199 | A | 2/2025 | |
| DE | 19849728 | A1 * | 5/2000 | ............... D01H 1/24 |

(Continued)

*Primary Examiner* — Oluseye Iwarere
*Assistant Examiner* — Daniel K Schlak
(74) *Attorney, Agent, or Firm* — Pierce Atwood LLP

(57) ABSTRACT

In some implementations, an energy conversion device may include a magnet assembly in a fixed frame, and first and second printed circuit board (PCB) armatures configured to be independently movable relative to the fixed frame. The magnet assembly may include one or more magnets configured to generate first magnetic flux within an active region. The first PCB armature may include at least a first winding configured to generate second magnetic flux within the active region, and the second PCB armature may include at least a second winding configured to generate third magnetic flux within the active region.

26 Claims, 11 Drawing Sheets

(51) Int. Cl.
_H02K 41/035_ (2006.01)
_H02K 21/24_ (2006.01)
_H02K 41/00_ (2006.01)

(56) References Cited

U.S. PATENT DOCUMENTS

| | | | | |
|---|---|---|---|---|
| 4,998,420 | A * | 3/1991 | Scavino | D04B 15/58 |
| | | | | 66/138 |
| 5,168,185 | A * | 12/1992 | Umehara | H02K 41/0358 |
| | | | | 310/15 |
| 5,523,911 | A * | 6/1996 | Mita | G11B 5/5521 |
| | | | | 360/264.7 |
| 5,761,007 | A * | 6/1998 | Price | G11B 5/4813 |
| 5,942,833 | A * | 8/1999 | Yamaguchi | H02K 7/063 |
| | | | | 340/407.1 |
| 6,006,795 | A * | 12/1999 | Corain | B65H 54/2833 |
| | | | | 139/438 |
| 6,437,770 | B1 * | 8/2002 | Venema | H01F 7/14 |
| | | | | 345/157 |
| 6,449,130 | B1 * | 9/2002 | Koyama | G11B 5/4813 |
| 6,563,657 | B1 * | 5/2003 | Serrano | G11B 5/5578 |
| | | | | 360/48 |
| 7,071,591 | B2 | 7/2006 | Hovanky et al. | |
| 7,109,625 | B1 | 9/2006 | Jore et al. | |
| 7,476,999 | B2 | 1/2009 | Friedland | |
| 9,673,688 | B2 | 6/2017 | Shaw | |
| 9,800,109 | B2 | 10/2017 | Shaw | |
| 10,170,953 | B2 | 1/2019 | Shaw | |
| 10,211,694 | B1 | 2/2019 | Shaw | |
| 10,581,358 | B2 | 3/2020 | Frampton et al. | |
| 11,005,322 | B2 | 5/2021 | Milheim et al. | |
| 11,121,614 | B2 | 9/2021 | Milheim | |
| 11,336,130 | B1 | 5/2022 | Shaw et al. | |
| 11,527,933 | B2 | 12/2022 | Shaw et al. | |
| 11,626,779 | B2 | 4/2023 | Shaw et al. | |
| 11,751,330 | B2 | 9/2023 | Milheim et al. | |
| 12,191,720 | B1 | 1/2025 | Guedes-Pinto et al. | |
| 12,231,014 | B1 | 2/2025 | Radkey-Pechacek et al. | |
| 2002/0047325 | A1 * | 4/2002 | Hente | H02K 33/18 |
| | | | | 310/36 |
| 2004/0012892 | A1 * | 1/2004 | Jeong | G11B 21/025 |
| | | | | 360/265.8 |
| 2007/0102325 | A1 * | 5/2007 | Boffo | H02K 41/0358 |
| | | | | 209/225 |
| 2009/0161498 | A1 * | 6/2009 | Bammert | G11B 7/0935 |
| | | | | 369/13.2 |
| 2010/0037979 | A1 * | 2/2010 | Borer | D03C 13/00 |
| | | | | 139/59 |
| 2011/0193429 | A1 * | 8/2011 | Lee | H02K 7/063 |
| | | | | 310/43 |
| 2016/0327137 | A1 * | 11/2016 | Paine | H02K 41/0356 |
| 2020/0408157 | A1 * | 12/2020 | Radue | H02K 41/0358 |

FOREIGN PATENT DOCUMENTS

| | | | | | |
|---|---|---|---|---|---|
| DE | 102014208336 | A1 * | 11/2015 | | H01F 5/003 |
| EP | 0461524 | A1 * | 12/1991 | | D03D 47/38 |
| WO | WO-2018087436 | A1 * | 5/2018 | | H02K 41/031 |
| WO | WO-2025011892 | A1 * | 1/2025 | | H02K 41/0358 |

* cited by examiner

AXIAL FLUX ACTUATORS USING PRINTED CIRCUIT BOARD ARMATURES

RELATED APPLICATIONS

This application claims the benefit under 35 U.S.C. § 119(e) of U.S. Provisional Application Ser. No. 63/804,753, entitled AXIAL FLUX ACTUATORS USING PRINTED CIRCUIT BOARD ARMATURES, filed May 13, 2025, the entire contents of which are incorporated herein by reference for all purposes.

BACKGROUND

Axial flux motors and generators described by several patents, including U.S. Pat. Nos. 7,109,625; 9,673,688; 9,800,109; 10,170,953; 10,211,694; 11,005,322; 11,121,614; 11,336,130; 11,527,933; 11,626,779; 11,751,330, the entire contents of which are incorporated herein by reference, feature a generally planar printed circuit board stator (PCB) assembly interposed between magnets magnetized with alternating north-south poles. Machines built according to the teachings of these patents and related art have stators that are built using printed circuit board techniques.

SUMMARY

In some aspects, the techniques described herein relate to an energy conversion device, including: at least a first magnet assembly in a fixed frame, the first magnet assembly including one or more first magnets configured to generate first magnetic flux within an active region; and at least first and second printed circuit board (PCB) armatures configured to be independently movable relative to the fixed frame, the first PCB armature including at least a first winding configured to generate second magnetic flux within the active region and the second PCB armature including at least a second winding configured to generate third magnetic flux within the active region.

In some aspects, the techniques described herein relate to an energy conversion device, including: at least a first magnet assembly in a fixed frame, the first magnet assembly including first magnets configured to generate first magnetic flux within an active region that extends along at least a portion of an annulus; and a printed circuit board (PCB) armature segment including at least a first winding configured to generate second magnetic flux within the active region, wherein the PCB armature segment is configured and arranged so that the first winding can move, relative to the fixed frame, in an arcuate path about an axis of rotation, and wherein radial edges of the PCB armature segment subtend an angle of less than 360 degrees about the axis of rotation.

In some aspects, the techniques described herein relate to an energy conversion device, including: at least a first magnet assembly in a fixed frame, the first magnet assembly including first magnets configured to generate first magnetic flux within an active region that extends along at least a portion of an annulus; and at least a first printed circuit board (PCB) armature including at least a first winding configured to generate second magnetic flux within the active region, wherein the first PCB armature: is configured and arranged so that the first winding can move, relative to the fixed frame, in an arcuate path within the annulus; and includes at least one feature that extends radially outwardly from the annulus and is configured to enable attachment of a mechanical load so that the mechanical load can be driven by movement of the first PCB armature relative to the fixed frame.

DETAILED DESCRIPTION

Figure 1:
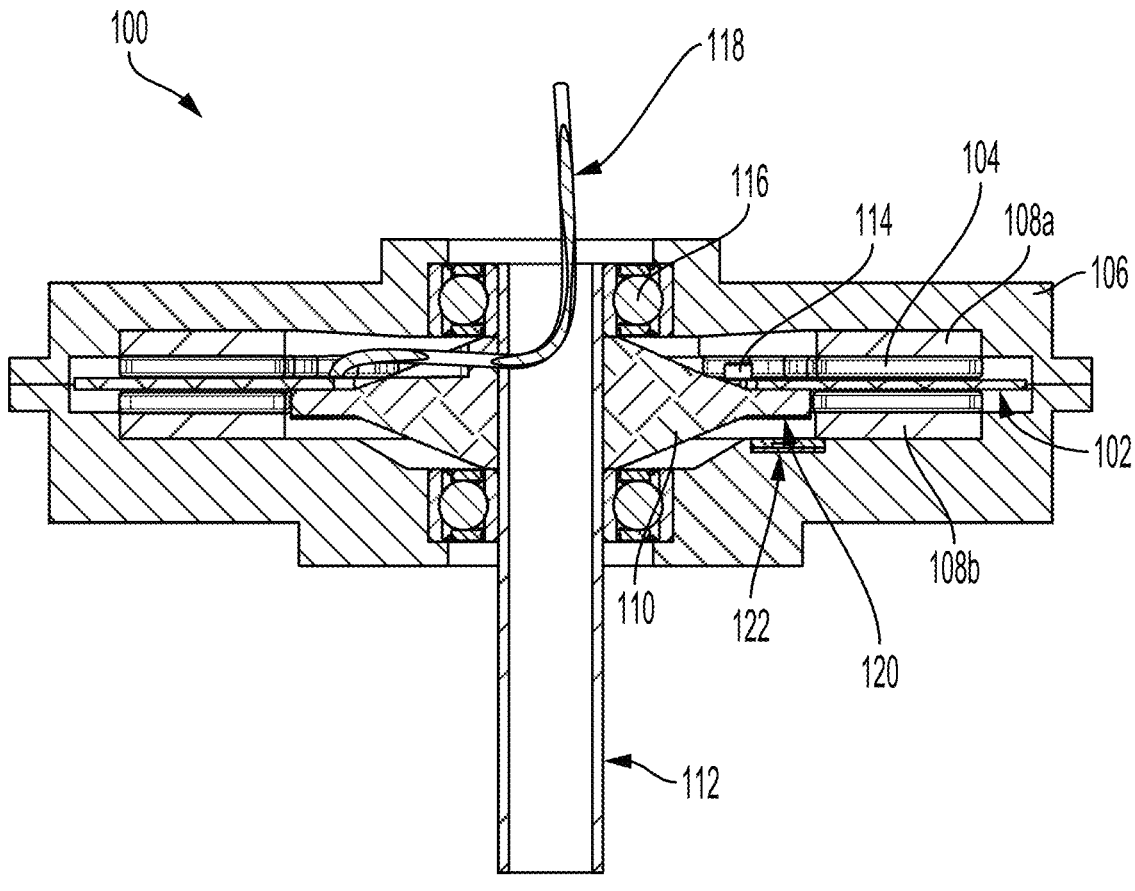
FIG. 1 shows an example actuator including a rotating PCB armature interposed in a gap between a pair of magnet assemblies in a fixed frame, with phase connection wires emerging centrally through a shaft.

In a conventional configuration of an axial flux machine employing a PCB armature, such as the axial flux machines described in the above-referenced patents, the PCB armature is in a fixed frame (sometimes referred to as the laboratory frame of reference or "lab frame"), i.e., it is stationary. One benefit of this conventional approach is that it makes it convenient to remove heat due to losses in the PCB armature, for example, by creating a thermal connection between a periphery of the PCB armature and a housing or other heat sink in the fixed frame. Another benefit of the conventional approach is that the stationary nature of the PCB armatures makes it relatively easy to establish durable electrical connections between the windings of the PCB armature and a power electronic circuit and controller in the fixed frame.

The rotor assemblies in such configurations (which include high-mass components, such as permanent magnets and one or more back irons) can have relatively large moments of inertia about the axis of rotation and for that reason can have time constants that are greater than desired for some applications. Because the mass of a PCB armature is generally much smaller than the mass of an assembly including magnets and back iron(s), by using the PCB armature as a rotor rather than a stator, the rotor's moment of inertia can be reduced significantly, thus resulting in an axial flux machine with a much lower time constant.

The present disclosure describes various novel configurations of axial flux machines with PCB armatures in which the roles of stator and rotor are reversed, so that the magnets and back iron(s) are in the stationary frame and the PCB armature is allowed to rotate. The axial flux machine configurations disclosed herein can thus offer extremely fast time constants and low moments of inertia, as well as other useful features.

In conventional motors, electrical connections to a rotating armature are typically established using brushes or similar components. For example, U.S. Pat. No. 2,970,238 describes a motor that uses a composite armature in a rotating frame, along with a brush arrangement that effectively commutates the machine. In most applications, such components tend to significantly reduce the useful life of the machine. The example axial flux machines disclosed herein are specially designed to tolerate the additional complexity of connections to a moving PCB armature.

In many applications, the moment of inertia, or perhaps more accurately the time constant, of a machine is a critical aspect of its performance. The moment of inertia J of a motor simply relates to the amount of torque required to achieve a particular angular acceleration, i.e., $$J \frac{d^2}{dt^2} \theta = \tau.$$

In the context of a motor, the ability to produce torque increases with motor size, as does the moment of inertia. Hence, for a motor to overcome its own moment of inertia and offer a higher acceleration potential, increasing size to obtain more torque may not provide the desired result. Indeed, the moment of inertia for a disc is $$J = \frac{1}{2} M r^2$$

where r is the radius of the disc, and M is the mass. The mass in turn can be written as $$M = \pi r^2 h \rho$$

where h is the height of the disc, and $\rho$ is the mass density. Combining these two equations reveals an $r^4$ dependence, which presents design challenges in axial flux high-dynamic applications. In many cases these challenges can be addressed with specialized designs that optimize motor time constant, but the scaling remains.

However, when comparing the moment of inertia of the magnet assembly of an axial flux machine, which comprises steel and magnetic material, to a PCB armature of such a machine, the PCB armature has a fraction of the mass. For equal radii, this suggests that the moment of inertia of the PCB armature is smaller by the ratio of the masses. In many designs, this ratio can exceed an order of magnitude.

The unfortunate aspect of using a rotating armature is that current must be conveyed to the moving armature from the fixed frame. The mechanism used in a traditional permanent magnet brushed DC motor involves a commutator ring and carbon brushes that serve dual purposes. The brushes provide an electrical connection from the fixed frame to the rotating frame, and also "switch" the current into the armature windings to ensure torque production regardless of rotor position. Unfortunately, brushes are subject to wear and erosion, create particulate and electrical noise, and require maintenance. There is a trade-off between the radius at which the brush surface is placed and the surface speed of the wear surface, as well as practical limits in terms of the allowed current in the brush assembly.

Slip rings can provide electrical contact to a rotating frame but, unlike brushes, do not commutate as a function of rotation. In some of the example actuators disclosed herein, slip rings are employed together with components that allow the actuators to be electrically commutated. By introducing appropriate design features into an axial flux machine, as explained in detail below, slip rings can thus be used to provide power to a PCB armature in the moving frame.

Another option in terms of conveying power to the rotating frame is to use a transformer arrangement, in which a gap between two cores allows rotation between the primary and secondary side. The additional components required in the rotating frame with this scheme, not to mention peak power limitations, would likely eliminate any advantage in terms of the reduction of moment of inertia.

For many actuators, particularly those operating through a relatively limited range of angles, it may be possible to arrange satisfactory connections by the use of flexible wires to the rotating frame. The use of coils, flexures, and similar arrangements in these wire connections to distribute the stresses accompanying the motion of the actuator can be beneficial in reducing loading effects. It may also helpful to locate these connections at a small radius with respect to the axis of rotation, to minimize movement relative to the fixed frame. Additionally, in cases where the angle of actuation is limited, it may be possible to use a magnet assembly segment and/or a PCB armature segment. As used herein, the term "magnet assembly segment" refers to a magnet assembly (e.g., magnets attached to a back iron) that subtends an angle less than 360 degrees, and the term "PCB armature segment" refers to a PCB armature that subtends an angle less than 360 degrees.

In addition to the potential for very high-speed operation and low moment of inertia, there are design advantages inherent to an axial flux PCB rotor actuator. In particular, multiple moving elements can be placed in a single gap, and subject to the same flux in this gap. As the armature reaction is very small in an air-core machine, these multiple moving elements can be operated independently, but with a closely matched ratio of current to torque among the actuating elements. This can be advantageous, for example, in end-effector or grasping applications.

Disclosed herein are several unique configurations of PCB armatures incorporating features of PCB stators, such as those described in the above-referenced patents (including U.S. Pat. No. 7,109,625 and related art), which may be used as moving elements (e.g., as components of a rotor) of actuators.

FIG. 1 shows a cross sectional diagram of an example actuator 100 in which a PCB armature 102 is included as a component of a rotor. As shown, the PCB armature 102 may, for example, be interposed in a gap between magnets 104 that are held stationary with respect to a housing 106 of the actuator 100. In the illustrated example, one set of magnets 104 is attached to a first back iron 108*a* disposed on a first side of the PCB armature 102 and another set of magnets is attached to a second back iron 108*b* disposed on a second side of the PCB armature 102 opposite the first side, with the first back iron 108*a* and the second back iron 108*b* both being fixedly attached to the housing 106. In other implementations, the magnets 104 may instead be disposed on only one side of the PCB armature 102.

As shown in FIG. 1, in some implementations, a hub 110 may be fixedly attached to a shaft 112 of the actuator 100 (e.g., by inserting the shaft 112 into a hole of the hub 110 after the hub 110 has been heated to cause the hole to expand and then allowing the hub 110 to cool so that the hole contracts around the shaft 112). As also shown, in some implementations, the PCB armature 102 may be secured to the hub 110 using one or more fasteners 114 (e.g., screws), and a set of bearings 116 may be positioned to allow the PCB armature 102, the hub 110, and the shaft 112 to rotate, as a unit, relative the housing 106. In some implementations, the PCB armature 102 may be shaped as an annular disc that fully encircles the shaft 112 of the machine. In other implementations, the PCB armature 102 may instead be a PCB armature segment that subtends an angle less than 360 degrees.

The annular region of the PCB armature 102 may extend between a first radial distance r1 (measured from an axis of rotation of the assembly including the PCB armature 102, the hub 110, and the shaft 112) and a second radial distance r2 (also measured from the axis of rotation of the assembly including the PCB armature 102, the hub 110, and the shaft 112), and may be located within the annular active region of the machine. The inner and outer radii of the magnets 104 of the actuator 100 may be positioned at or near the radial distance r1 (measured from axis of rotation of the assembly including the PCB armature 102, the hub 110, and the shaft 112) and the radial distance r2 (also measured from the axis of rotation of the assembly including the PCB armature 102, the hub 110, and the shaft 112), respectively, thus creating axially directed magnetic flux within the annular active region. Flux density measurements demonstrate that the flux density in this region is typically greater than approximately forty percent of a peak axial flux density within the gap of the machine, while the flux density outside of this region is typically less than forty percent of the peak flux density within the gap.

As illustrated in FIG. 1, in some implementations, phase wires 118 for the actuator 100 may be attached to the PCB armature 102 and may extend into and through a central passage within the shaft 112. The phase wires 118 may be used, for example, to provide one or more phases of current (e.g., three phases) from a drive 202 (shown in FIG. 2) to windings of the PCB armature 102. The drive 202 may include, for example, a power electronic circuit and controller that includes a plurality of switches configured to selectively connect a voltage source across terminals for windings of the PCB armature 102 so that the windings generate a peak magnetic flux that rotates relative to the PCB armature 102.

As shown in FIG. 1, in some implementations, the actuator 100 may include one or more encoder targets 120 attached to the rotor and one or more encoder sensors 122 attached to the fixed frame (e.g., to the housing 106) to enable the encoder sensor(s) 122 to determine a current position of the rotor relative to the fixed frame. FIG. 1 illustrates how an encoder target 120 may be disposed, for example, near an outer periphery of the hub 110 and a corresponding encoder sensor 122 may be disposed on a portion of the housing 106 that is at approximately the same radial distance from the axis of rotation as the encoder target 120. Another possible location of an encoder target 120 and an encoder sensor 122 is illustrated in FIG. 3, which shows an example actuator 300 (described in more detail below) in which an encoder target 120 is disposed near an outer periphery of the PCB armature 102 and a corresponding encoder sensor 122 is disposed on a portion of the housing 106 that is at approximately the same radial distance from the axis of rotation as the encoder target 120.

The current, voltage, and torque, and speed relationships for the actuator 100 may, in principle, be substantially similar to those of a motor constructed with the PCB armature 102 in a stationary frame. Differences include that the moment of inertia of the moving assembly is considerably reduced, and the attachment of the phase wires 118 to the PCB armature 102 limit the range of actuation to a few revolutions.

Figure 2:
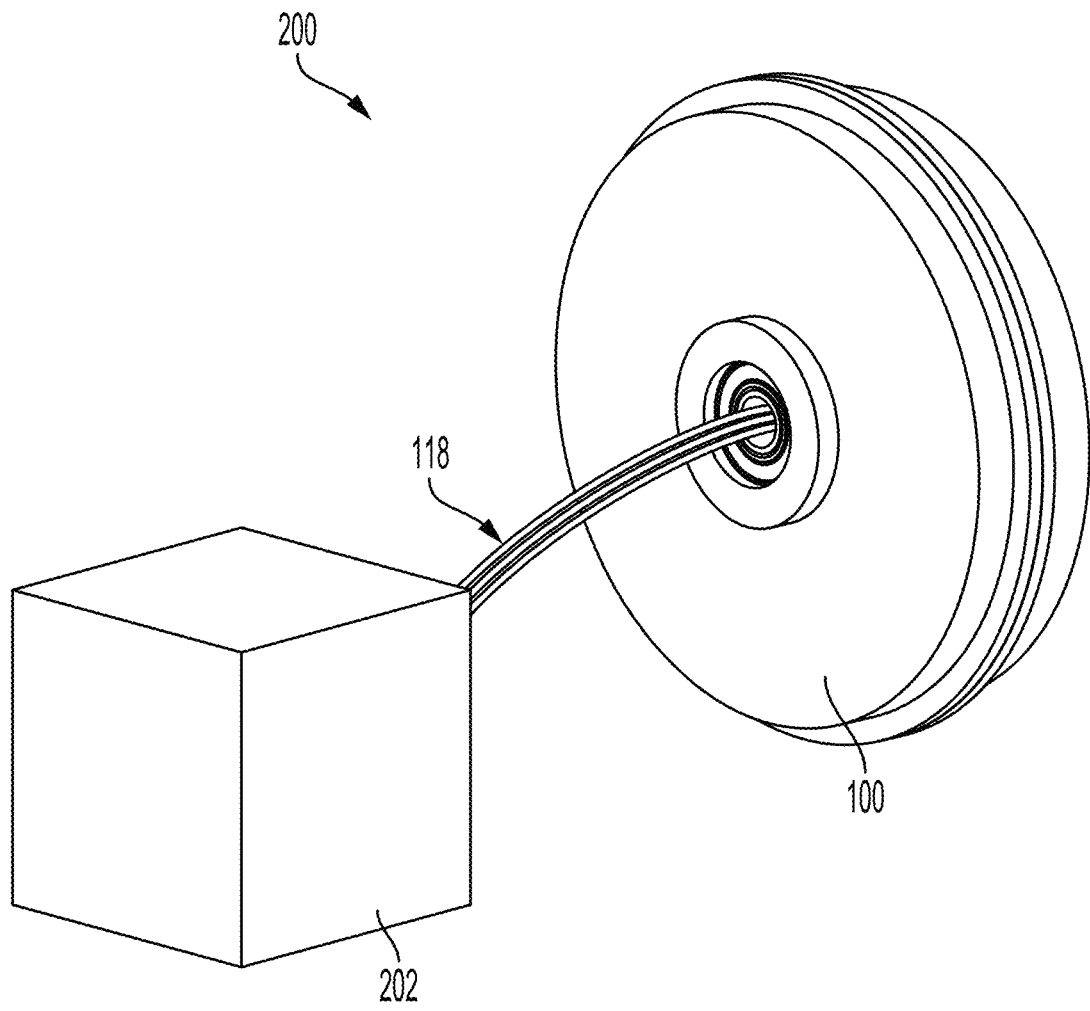
FIG. 2 shows an example actuator assembly including a combination of the actuator shown in FIG. 1 and a power electronic circuit and controller.

FIG. 2 illustrates an example actuator system 200 in which the actuator 100 (shown in FIG. 1) is connected to a power electronic circuit and controller (i.e., the drive 202) in the fixed frame to enable the drive 202 to drive and control the actuator 100. In some implementations, the drive 202 may estimate or otherwise build up information about the rotor position (e.g., via signals collected by the one or more encoder sensors 122) to smoothly and effectively control the motion of the actuator. Although not shown in FIG. 2, it should be appreciated that signals from the encoder sensor(s) 122 may be provided to the drive 202 (e.g., via one or more cables or wireless connections—not shown in FIG. 2) to enable the drive 202 to properly control the actuator's motion. It should be also appreciated that, in some implementations, the drive 202 may be attached to or otherwise integrated with the actuator 100, e.g., by attaching the drive 202 to a portion of the housing 106 at or near the location of an opening in the shaft 112 through which the phase wires 118 pass, so that a stationary relationship can be maintained between the drive 202 and the housing 106.

Figure 3:
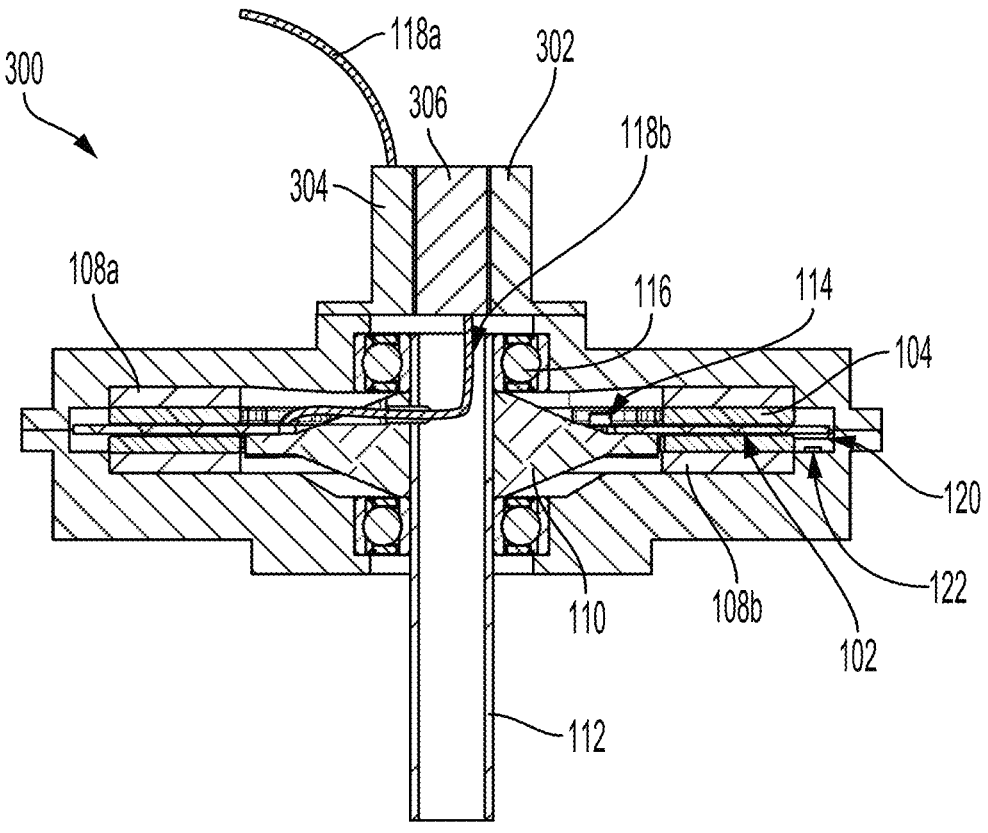
FIG. 3 shows an example actuator including a rotating PCB armature interposed in a gap between a pair of magnet assemblies in a fixed frame, with phases connected via a slip ring assembly located axially with respect to the actuator.

FIG. 3 shows an example actuator 300 which is similar to the actuator 100 shown in FIG. 1, except that the electrical connections between the PCB armature 102 and the fixed frame (e.g., to and/or from the drive 202 shown in FIG. 2) are provided through the use of a slip ring assembly 302. As illustrated, in some implementations, the slip ring assembly 302 may include first components 304 that are held stationary with respect to the fixed frame (e.g., by being affixed to the housing 106) and second components 306 that rotate together with the rotor (e.g., by being affixed to the shaft 112). For example, as shown, a first set of phase wires 118*a* may be attached to the first components 304 of the slip ring assembly 302 to provide the requisite electrical connections to the fixed frame (e.g., to and/or from the drive 202) and a second set of phase wires 118*b* may be attached to the second components 306 of the slip ring assembly 302 to provide the requisite electrical connections to the PCB armature 102, with the slip ring assembly 302 electrically connecting the individual conductors of the first set of phase wires 118*a* with corresponding conductors of the second set of phase wires 118*b*. In the illustrated example, the individual slip rings of the slip ring assembly 302 extend axially from the actuator 100 and the flow of current through the slip rings to the fixed frame is substantially radial. In other implementations, the slip rings may instead be attached to the PCB armature 102 and may convey current in a substantially axial direction. Due to the use of slip rings, the actuator in FIG. 3 may be used without limitation on the number of continuous rotations. Like the actuator 100 (shown in FIG. 1), in some implementations, the PCB armature 102 of the actuator 300 may be shaped as an annular disc that fully encircles the shaft 112 of the machine. In other implementations, the PCB armature 102 may instead be a PCB armature segment that subtends an angle less than 360 degrees.

Figure 4:
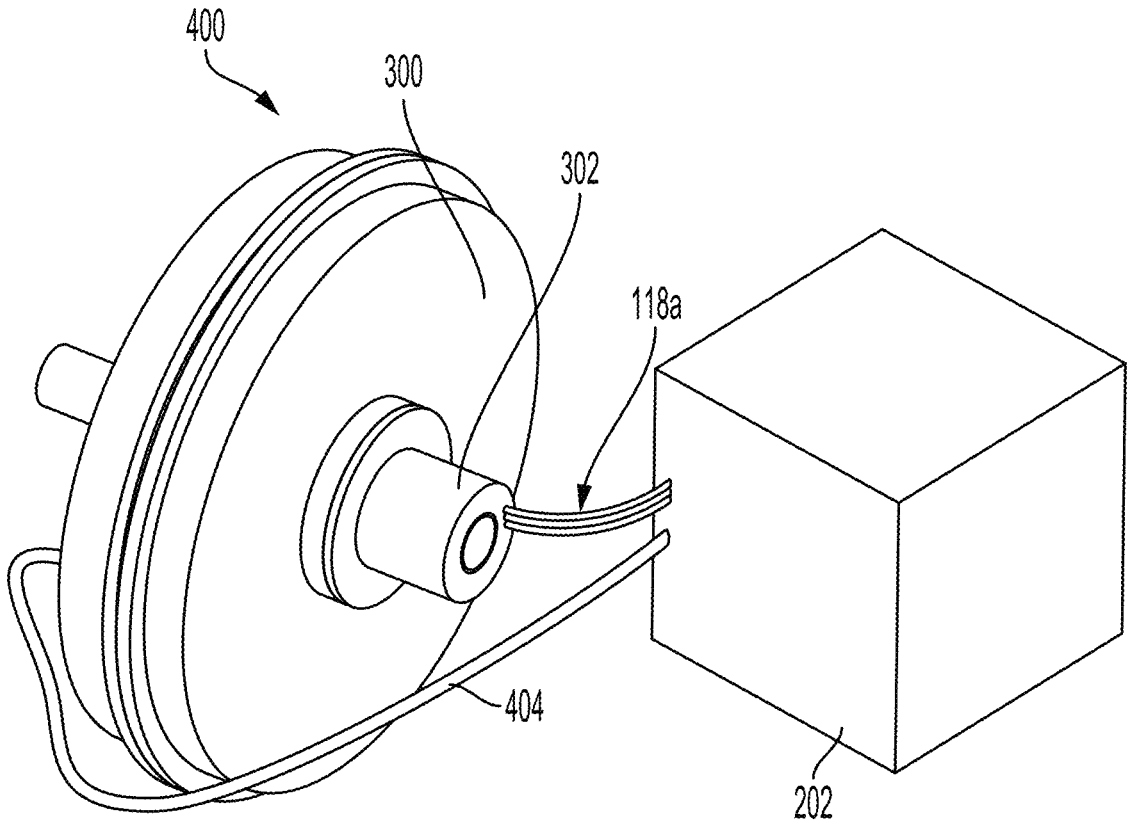
FIG. 4 shows an example actuator assembly including a combination of the actuator shown in FIG. 3 and a power electronic circuit and controller, and with provision for feedback regarding angle of the shaft.

FIG. 4 shows an example actuator system 400 in which the actuator 300 (shown in FIG. 3) is connected to a power electronic circuit and controller (i.e., a drive 202) in the fixed frame to enable the drive 202 to drive and control the actuator 300. As shown, the drive 202 may be connected to the first set of phase wires 118a to provide current for windings of one or more phases of the PCB armature 102 and may also be connected to one or more encoder wires 404 to receive information from the encoder sensor(s) 122, thus enabling the drive 202 to use information about the rotor position to properly control the actuator. The use of encoder target(s) 120 and encoder sensor(s) 122 of the type described may be more more practical in this situation than a Hall-effect sensor that operates on the leakage flux of the magnet assembly, as the magnet assembly of the actuator 300 is in the fixed frame.

Figure 5:
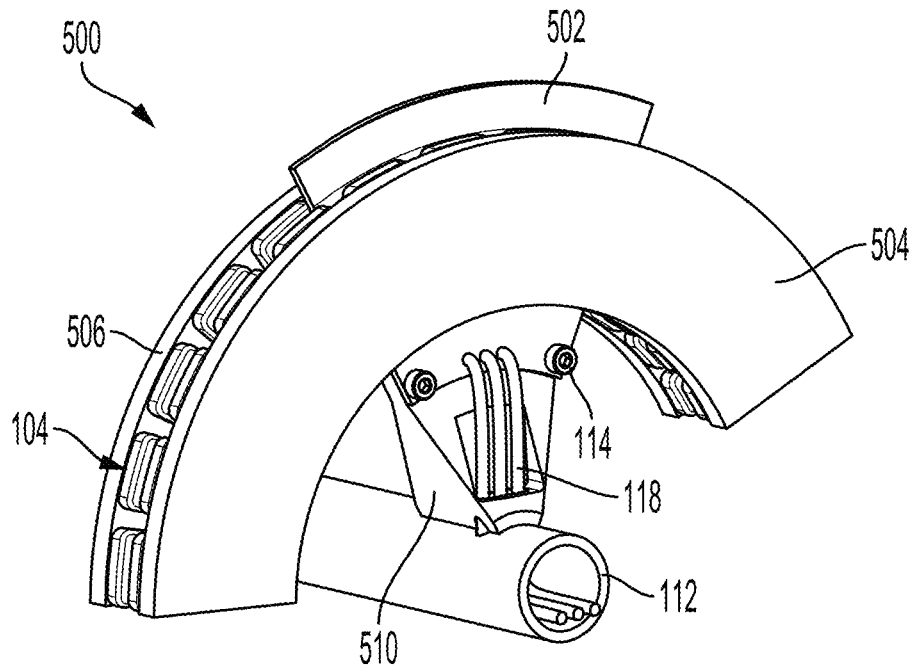
FIG. 5 shows an example actuator including rotating PCB armature segment interposed in a gap between a pair of magnet assembly segments in a fixed frame, with phase connection wires emerging centrally through a shaft.

FIG. 5 shows a partial view of an example actuator 500 which is similar to the actuators 100 and 300 (shown in FIGS. 1 and 3, respectively) but in which the rotating PCB armature is a PCB armature segment 502 (i.e., a PCB armature that subtends an angle less than 360 degrees) as opposed to an annular disc fully encircling the shaft 112 of the machine. As shown, in some implementations, the PCB armature segment 502 may be attached to a hub component 510 (e.g., using one or more fasteners 114) and the hub component 510 may be fixedly attached to, or integral with (e.g., formed together as a single unit), the shaft 112. A combination of a PCB armature segment and a hub component that supports such a PCB armature segment so that the PCB armature component can rotate about an axis of rotation and relative to the fixed frame is sometimes referred to herein as a "PCB rotor segment." Although not shown in FIG. 5, it should be appreciated that, in some implementations, the shaft 112 may be attached, either directly or indirectly, to a mechanical load.

As shown in FIG. 5, in some implementations, the magnet assemblies of the actuator 500 (including back irons 504, 506 and magnets 104) may also be magnet assembly segments (i.e., magnet assemblies that subtend an angle less than 360 degrees). In such implementations, the actuator 500 may be operable only through a limited range of angles, e.g., as defined by the angular range subtended by the arrays of magnets 104 of the magnet assembly segments. In other implementations, the magnet assemblies of the actuator 500 may instead be shaped as annular discs that fully encircle the shaft 112 of the machine, so as to allow the PCB rotor segment to be driven through a full 360 degree range of angles.

Similar to the actuators 100 and 300, the phase wires 118 of the actuator 500 may be connected to the PCB armature segment 502 to provide power (e.g., supplied by the drive 202) for one or more phases of the PCB armature segment 502. The phase wires 118 may either be conductors that are directly to one or more components in the fixed frame (e.g., a drive 202), in which case a number of rotations of the PCB rotor segment may be limited to a few revolutions), or may instead be connected to one or more components in the fixed frame (e.g., a drive 202) via a slip ring assembly or the like (as described in connection with FIGS. 3 and 4), so that the number of revolutions that could be taken by the PCB rotor segment would be unlimited.

Figure 6:
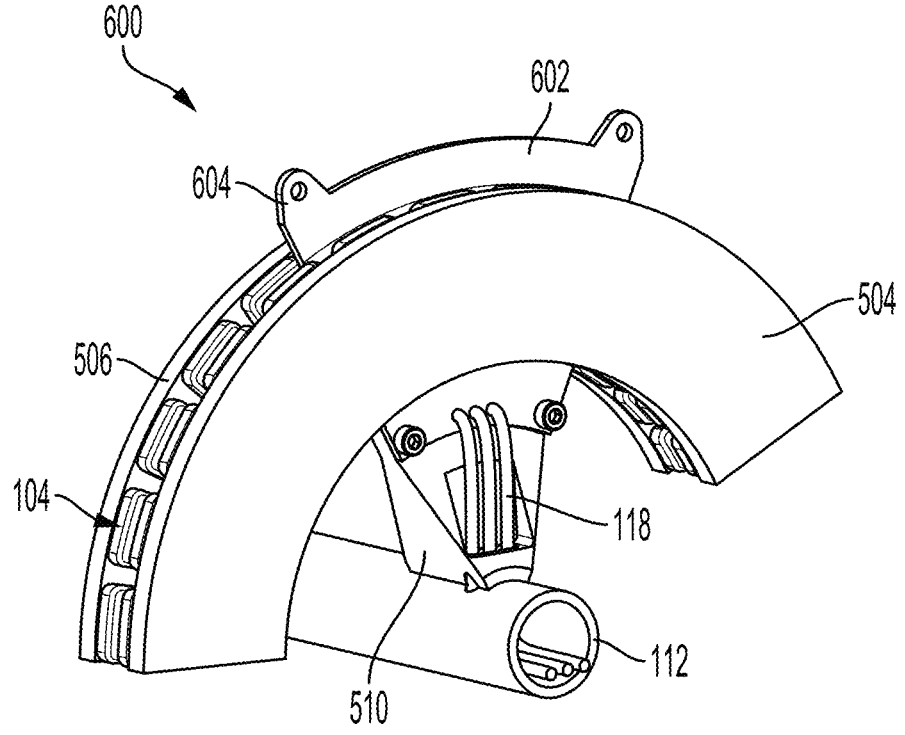
FIG. 6 shows an example actuator that is similar to the example actuator shown in FIG. 5, but which includes mechanical provisions on the PCB armature segment to drive an attached mechanical load.

FIG. 6 shows a partial view of an example actuator 600 which is similar to the actuator 500 (shown in FIG. 5) except that it employs a PCB armature segment 602 that includes one or more features 604 (e.g., mounting tabs with holes) that enable a mechanical load to be connected directly to the PCB armature segment 602. In some cases, the inclusion of such features 604 on the PCB armature segment 602 may reduce the design complexity associated with the shaft 112 and connection of the phase wires 118, and may also keep moment of inertia to a minimum. Although FIG. 6 depicts the one or more features 604 as being disposed on the outer radius of the PCB armature segment 602, it should be appreciated that the feature(s) 604 may instead be located on other available radial positions on the PCB rotor assembly.

Figure 7:
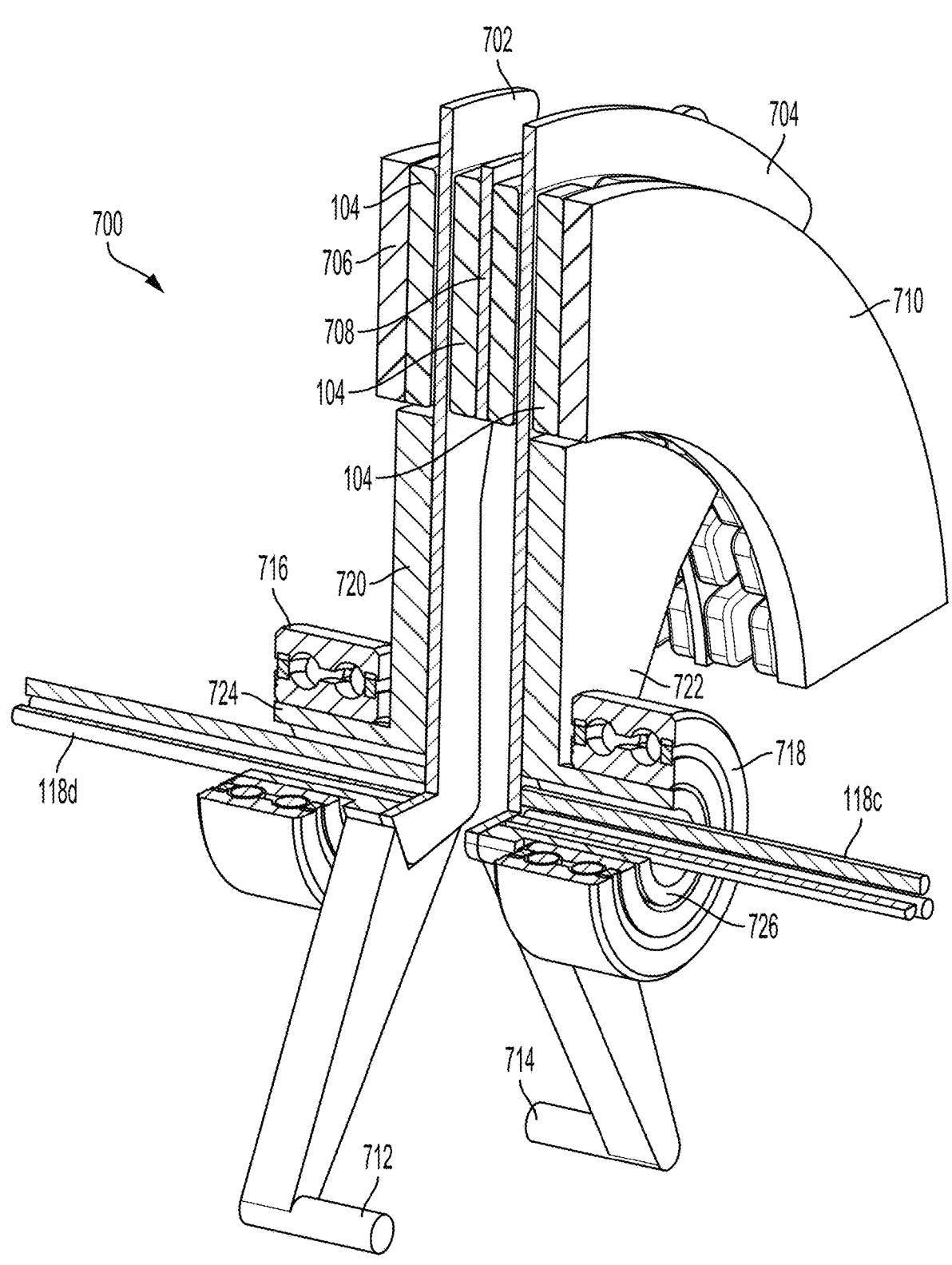
FIG. 7 shows an example actuator including two rotating and independently controllable PCB armature segments interposed in respective gaps between three different magnet assembly segments in a fixed frame.

FIG. 7 shows an example actuator 700 in which two PCB armature segments 702 and 704 (i.e., PCB armatures that subtend angles less than 360 degrees) of respective PCB rotor assemblies are disposed in different gaps formed by three different magnet assemblies in the fixed frame. In the illustrated example, the PCB armature segment 702 is fixedly attached to a hub component 720 (which includes an integral shaft 724), and the shaft 724 of the hub component 720 is fixedly attached to an inner race of a bearing 716. Similarly, in the illustrated example, the PCB armature segment 704 is fixedly attached to a hub component 722 (which includes an integral shaft 726), and the shaft 726 of the hub component 722 is fixedly attached to an inner race of a bearing 718. As such, the combination of the PCB armature segment 702 and the hub component 720 together form a first PCB rotor segment and the combination of the PCB armature segment 704 and the hub component 722 may together form a second PCB rotor segment, where the first and second PCB rotor segments can be independently rotated and controlled.

In the example implementation shown in FIG. 7, the magnet assemblies of the actuator 700 include a first magnet assembly (including a first back iron 706 and a first set of magnets 104), a second magnet assembly (including a second back iron 708 and a second set of magnets 104), and a third magnet assembly (including a third back iron 710 and a third set of magnets 104). As illustrated, in some implementations, the second magnet assembly may include magnets 104 on both sides of the back iron 708.

Although not illustrated in FIG. 7, it should be appreciated that, in some implementations, the first, second, and third magnet assemblies and the outer races of the bearings 716 and 718 may all be fixedly attached to a housing or other structure, so that the two PCB rotor segments (including the hub components 720, 722 and attached PCB armature segments 702, 704) are permitted to rotate independently relative to the magnets 104 and the housing/structure. As each of the independent gaps in such a configuration has its own magnets 104 and flux return path, the design of these actuator elements may be essentially independent. Further, in at least some implementations, the motion of each of the PCB rotor segments can be fully and independently controlled. As illustrated, in some implementations, each PCB rotor segment may include an attached torque arm 712, 714 that allows the connection of a respective attached mechanical load. As with the other example actuators described above, phase wires 118 may be used to supply power (e.g., from a drive 202) for one or more phases of respective PCB armature segments 702, 704.

As shown in FIG. 7, in some implementations, the magnet assemblies of the actuator 700 (including back irons 706, 708, and 710 and magnets 104) may be magnet assembly segments (i.e., magnet assemblies that subtend an angle less than 360 degrees). In such implementations, the PCB rotor segments of the actuator 700 may be operable only through a limited range of angles, e.g., as defined by the angular range subtended by the arrays of magnets 104 of the magnet assembly segments. In other implementations, the magnet assemblies of the actuator 700 may instead be shaped as annular discs that fully encircle the shaft 112 of the machine, so as to allow the respective PCB rotor segments to be driven through a full 360 degree range of angles.

As illustrated in FIG. 7, in some implementations, different groups of phase wires 118c and 118d may be connected to the respective PCB armature segments 702 and 704 to provide power (e.g., supplied by a drive 202) for one or more phases of each of the PCB armature segments 702, 704. In such an implementation, the drive 202 may be configured to generate separate drive signals for the respective PCB armature segments 702, 704, and possibly also receive separate signals from encoder sensor(s) (not shown in FIG. 7) from the actuator 700 to enable the drive 202 to independently control the motion of the respective PCB armature segments 702, 704 via the respective phase wire groups 118c, 118d.

The phase wires 118c, 118d may either be conductors that are directly to one or more components in the fixed frame (e.g., a drive 202), in which case a number of rotations of the PCB rotor segments may be limited to a few revolutions), or may instead be connected to one or more components in the fixed frame (e.g., a drive 202) via slip ring assemblies or the like (as described in connection with FIGS. 3 and 4), so that the number of revolutions that could be taken by the PCB rotor segments would be unlimited.

Figure 8:
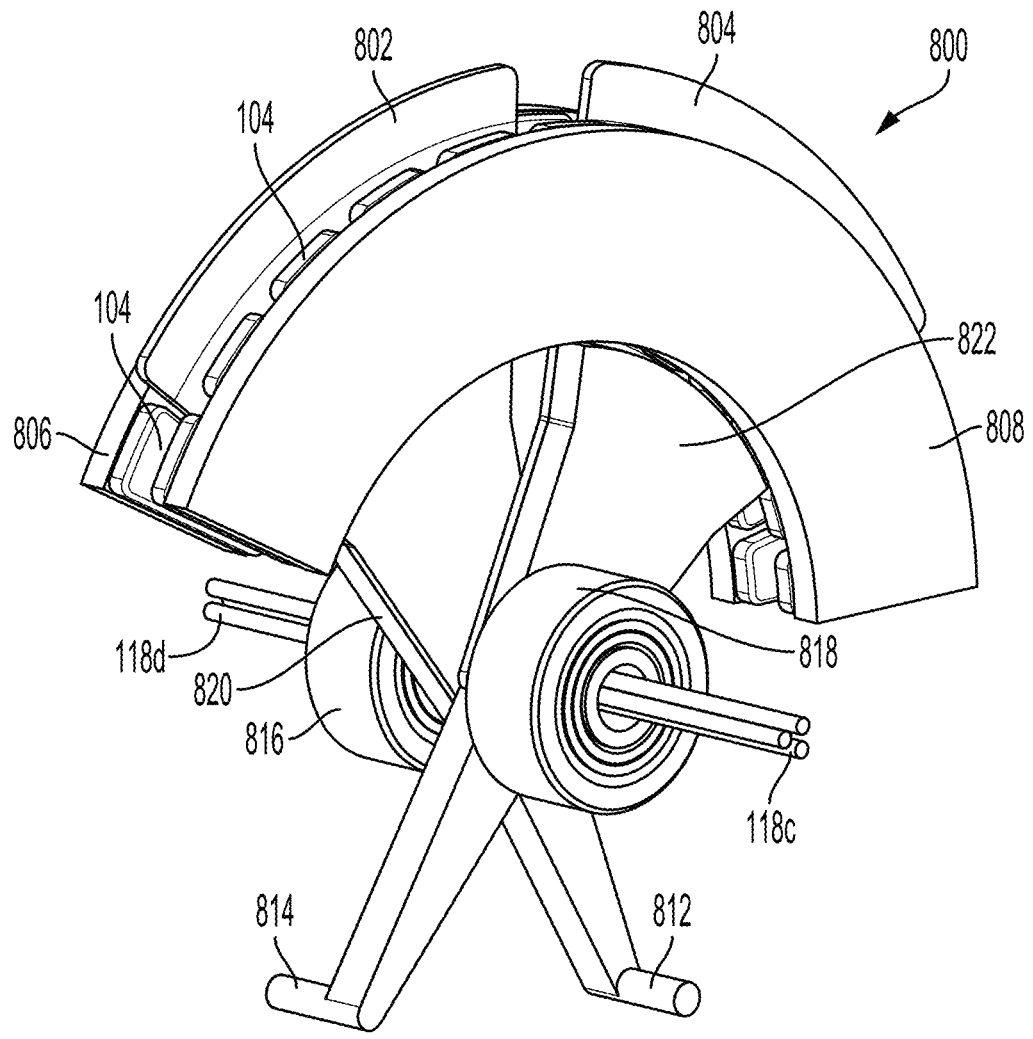
FIG. 8 shows an example actuator including two rotating and independently controllable PCB armature segments interposed in the same gap between a pair of magnet assembly segments in a fixed frame, potentially overlapping in their orbits.

FIG. 8 shows an example actuator 800 which in which two PCB armature segments 802 and 804 (i.e., PCB armatures that subtend angles less than 360 degrees) are disposed in the same magnetic gap between a first magnet assembly (including a first back iron 806 and a first set of magnets 104) and a second magnet assembly (including a second back iron 808 and a second set of magnets 104) in the fixed frame. In the illustrated example, the PCB armature segment 802 is fixedly attached to a hub component 820, and the hub component 820 is fixedly attached to an inner race of a bearing 816. Similarly, in the illustrated example, the PCB armature segment 804 is fixedly attached to a hub component 822, and the hub component 822 is fixedly attached to an inner race of a bearing 818. As such, the combination of the PCB armature segment 802 and the hub component 820 together form a first PCB rotor segment and the combination of the PCB armature segment 804 and the hub component 822 may together form a second PCB rotor segment, where the first and second PCB rotor segments can be independently rotated and controlled.

Although not illustrated in FIG. 8, it should be appreciated that, in some implementations, the first and second magnet assemblies and the outer races of the bearings 816 and 818 may all be fixedly attached to a housing or other structure, so that the two PCB rotor segments (including the hub components 820, 822 and attached PCB armature segments 802, 804) are permitted to rotate independently relative to the magnets 104 and the housing/structure. In at least some implementations, the motion of each of the PCB rotor segments can be fully and independently controlled. As illustrated, in some implementations, each PCB rotor segment may include an attached torque arm 812, 814 that allows the connection of a respective attached mechanical load. As with the other example actuators described above, phase wires 118 may be used to supply power (e.g., from a drive 202) for one or more phases of respective PCB armature segments 802, 804.

As shown in FIG. 8, in some implementations, the magnet assemblies of the actuator 800 (including back irons 806, 808 and magnets 104) may be magnet assembly segments (i.e., magnet assemblies that subtend an angle less than 360 degrees). In such implementations, the actuator 800 may be operable only through a limited range of angles, e.g., as defined by the angular range subtended by the arrays of magnets 104 of the magnet assembly segments. In other implementations, the magnet assemblies of the actuator 800 may instead be shaped as annular discs that fully encircle the shaft 112 of the machine, so as to allow the respective PCB rotor assemblies to be driven through a full 360 degree range of angles.

As illustrated in FIG. 8, in some implementations, different groups of phase wires 118c and 118d may be connected to the respective PCB armature segments 802 and 804 to provide power (e.g., supplied by a drive 202) for one or more phases of each of the PCB armature segments 802, 804. In such an implementation, the drive 202 may be configured to generate separate drive signals for the respective PCB armature segments 802, 804, and possibly also receive separate signals from encoder sensor(s) (not shown in FIG. 8) from the actuator 800 to enable the drive 202 to independently control the motion of the respective PCB armature segments 802, 804 via the respective phase wire groups 118c, 118d.

The phase wires 118c, 118d may either be conductors that are directly to one or more components in the fixed frame (e.g., a drive 202), in which case a number of rotations of the PCB rotor segments may be limited to a few revolutions), or may instead be connected to one or more components in the fixed frame (e.g., a drive 202) via slip ring assemblies or the like (as described in connection with FIGS. 3 and 4), so that the number of revolutions that could be taken by the PCB rotor segments would be unlimited.

Further, as illustrated in FIG. 8, in some implementations, the PCB rotor segments may be configured and arranged such that the PCB armature segment 802 is axially offset from the PCB armature segment 804, thus enabling the PCB armature segment 802 to partially or fully overlap the PCB armature segment 804 within the gap between the first and second magnet assemblies, as either or both of the PCB rotor segments are rotated relative to the fixed frame. To the extent that the PCB armature segments 802, 804 see the same flux density in the gap, the arrangement shown in FIG. 8 may allow the ratio of torques on the rotor segments to match the ratio of currents, without further correction or control involvement. In some implementations, the relative position of torque arms 812, 814 to the PCB armature segments 802, 804 can be adjusted to provide a range of angles where this feature is especially accurate. This may be useful in applications such as gripping or control surface actuation, where it may be advantageous to have closely matched reactions. The configuration of the actuator 800 also allows the possibility of armature redundancy in critical applications. In particular, should one rotor segment fail, the other rotor segment could be used.

Figure 9:
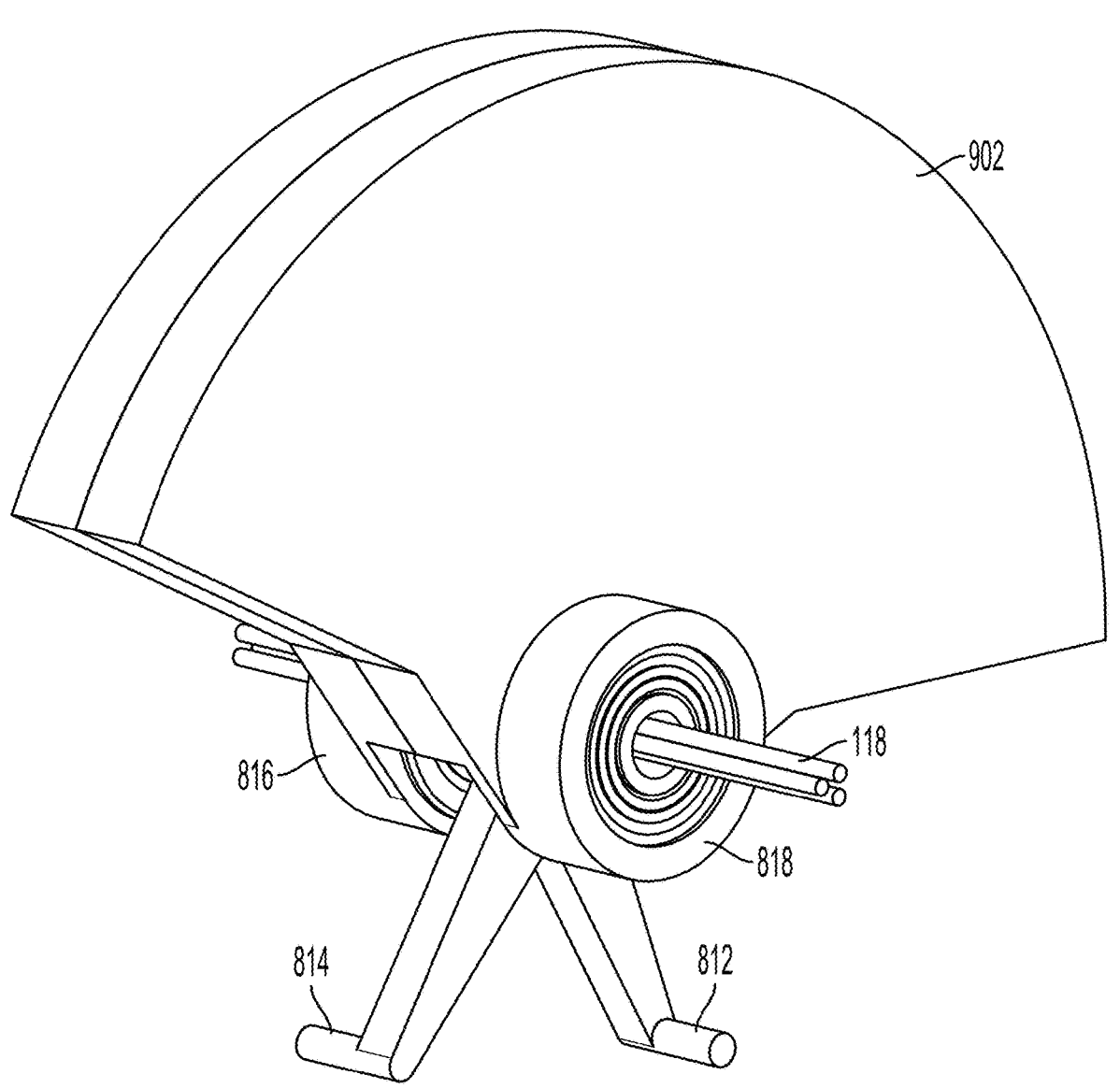
FIG. 9 shows how the actuator shown in FIG. 8 may be disposed within or otherwise supported by a housing.

FIG. 9 shows how, in some implementations, the actuator 800 (shown in FIG. 8) may be disposed within or otherwise supported by a housing 902, e.g., a protective enclosure, with the back irons 806 and 806 of the first and second magnet assemblies and the outer races of the bearings 816 and 818 being fixedly attached to the housing 902, so that such components are held stationary with respect to the fixed frame. It should be appreciated that the actuator 700 (shown in FIG. 7) may likewise be disposed within or otherwise supported by a similar housing in a similar fashion.

Figure 10:
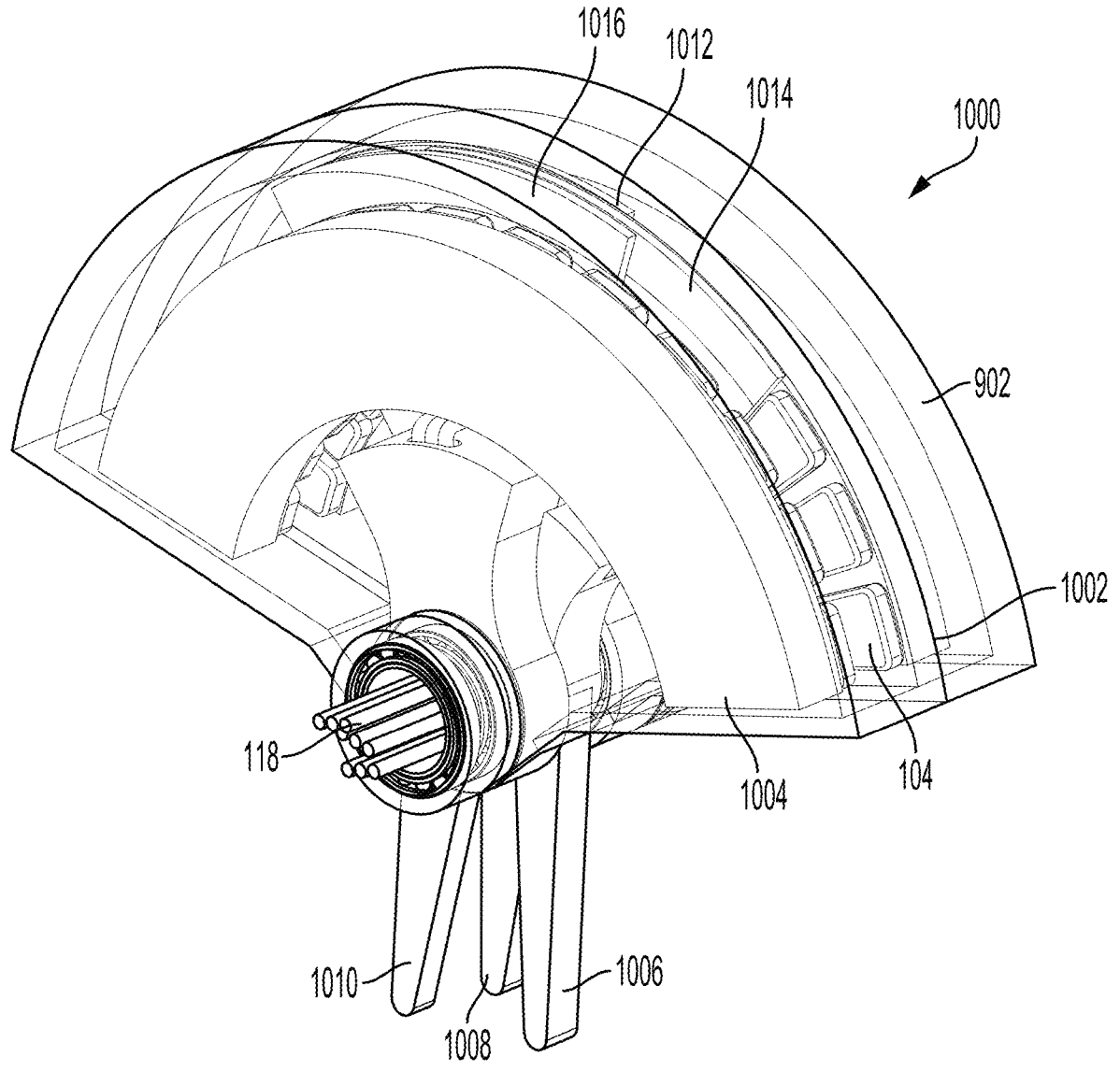
FIG. 10 shows an example actuator including three rotating and independently controllable PCB armature segments interposed in the same gap between a pair of magnet assembly segments in a fixed frame, potentially allowing precision control over the relative torques of different torque arms connected to the respective PCB armature segments.
Figure 11:
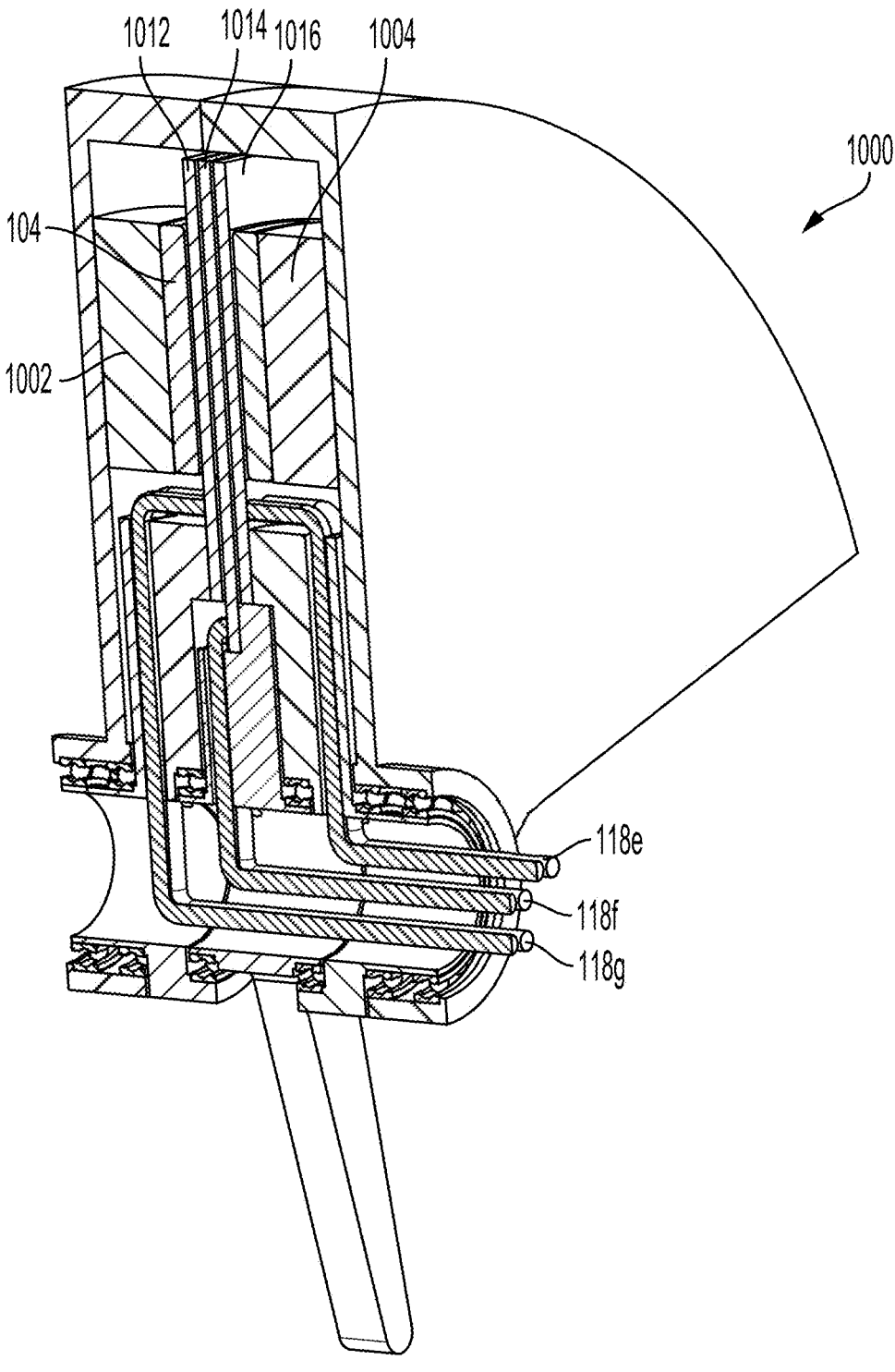
FIG. 11 shows a cross-sectional view of the example actuator shown in FIG. 10.

FIG. 10 shows an example actuator 1000 which is similar to the actuator 800 (shown in FIGS. 8 and 9) but which includes three rotatable and independently controllable PCB rotor segments (for a total of three PCB rotor segments) that are disposed in the same magnetic gap between a first magnet assembly (including a first back iron 1002 and a first set of magnets 104) and a second magnet assembly (including a second back iron 1004 and a second set of magnets 104) in the fixed frame, and also employs torque arms 1006, 1008, 1010 and bearing assemblies that have different configurations to allow for the independent rotation of each of the three PCB rotor segments relative to the fixed frame. FIG. 11 shows a cross-section of the actuator 1000 shown in FIG. 10.

As illustrated in FIG. 11, in some implementations, different groups of phase wires 118e, 118f, 118g may be connected to the respective PCB armature segments 1012, 1014, 1016 to provide power (e.g., supplied by a drive 202) for one or more phases of each of the PCB armature segments 1012, 1014, 1016. In such an implementation, the drive 202 may be configured to generate separate drive signals for the respective PCB armature segments 1012, 1014, 1016, and possibly also receive separate signals from encoder sensor(s) (not shown in FIGS. 10 and 11) from the actuator 1000 to enable the drive 202 to independently control the motion of the respective PCB armature segments 1012, 1014, 1016 via the respective phase wire groups 118e, 118f, 118g.

The phase wires 118e, 118f, 118g may either be conductors that are connected directly to one or more components in the fixed frame (e.g., a drive 202), in which case a number of rotations of the PCB rotor segments may be limited to a few revolutions), or may instead be connected to one or more components in the fixed frame (e.g., a drive 202) via slip ring assemblies or the like (as described in connection with FIGS. 3 and 4), so that the number of revolutions that could be taken by the PCB rotor segments would be unlimited.

Although, in the discussion above, the phase wires 118 and slip ring assemblies 302 are described as being connected at or near the inner diameter of the one or more PCB armatures 102 or PCB armature segments 502, 602, 702, 704, 802, 804, 1012, 1014, 1016, it should be appreciated that, in some implementations, such components may alternatively be connected at or near the outer diameter of the PCB armatures 102 or PCB armature segments 502, 602, 702, 704, 802, 804, 1012, 1014, 1016. Such a configuration may be advantageous, for example, when the PCB armatures 102 or PCB armature segments 502, 602, 702, 704, 802, 804, 1012, 1014, 1016 are very small, such that insufficient space is available at their inner diameters to accommodate the phases wires 118 or slip ring assemblies 302.

The following clauses describe example implementations of apparatuses in accordance with some aspects of the present disclosure.

Clause 1. A rotary energy conversion device, comprising: at least a first printed circuit board (PCB) armature configured to rotate about an axis of rotation and relative to a fixed frame, the first PCB armature including at least a first winding configured to generate first magnetic flux generally parallel to the axis of rotation and within an active region; at least one magnet assembly in the fixed frame, the at least one magnet assembly including at least a first magnet configured to generate second magnetic flux generally parallel to the axis of rotation and within the active region; and at least a first conductor in the fixed frame, the first conductor being electrically connected to the first winding to enable the first conductor to supply current to the first winding.

Clause 2. The rotary energy conversion device of clause 1, further comprising: a power electronic circuit in the fixed frame, wherein the power electronic circuit is connected to the first conductor to supply the current to the first conductor to generate the first magnetic flux.

Clause 3. The rotary energy conversion device of clause 1 or claim 2, further comprising: a slip ring assembly configured to electrically connect the first winding and the first conductor while the first PCB armature rotates relative to the fixed frame.

Clause 4. The rotary energy conversion device of clause 3, where the slip ring assembly is part of or integral to the first PCB armature.

Clause 5. The rotary energy conversion device of any of clause 1 or claim 2, wherein the first conductor is a cable that is directly connected to the first winding via a terminal on the first PCB armature.

Clause 6. The rotary energy conversion device of clause 5, wherein the terminal is located on a portion the first PCB armature that is closest to the axis of rotation.

Clause 7. The rotary energy conversion device of any of clauses 1-6, further comprising: a hub component supporting the first PCB armature; and a bearing assembly mechanically connected to the hub component to enable the hub component to rotate relative to the fixed frame.

Clause 8. The rotary energy conversion device of clause 7, wherein the hub component includes a torque arm configured to drive a mechanical load.

Clause 9. The rotary energy conversion device of any of clauses 1-8, wherein: the at least one magnet assembly includes at least a first magnet assembly including a first back iron and a first set of permanent magnets and a second magnet assembly including a second back iron and a second set of permanent magnets, the second back iron being oriented generally parallel to the first back iron; and the first PCB armature is disposed in a gap between the first set of permanent magnets and the second set of permanent magnets.

Clause 10. The rotary energy conversion device of clause 9, further comprising: a second PCB armature configured to rotate about the axis of rotation and relative to the fixed frame, independent of the first PCB armature, the second PCB armature including at least a second winding configured to generate third magnetic flux generally parallel to the axis of rotation, the second PCB armature being disposed with the gap; and a second conductor in the fixed frame, the second conductor being electrically connected to the second winding to enable the second conductor to supply current to the second winding.

Clause 11. The rotary energy conversion device of clause 10, further comprising: a third PCB armature configured to rotate about the axis of rotation and relative to the fixed frame, independent of the first PCB armature and the second PCB armature, the third PCB armature including at least a third winding configured to generate fourth magnetic flux generally parallel to the axis of rotation, the third PCB armature being disposed with the gap; and a third conductor in the fixed frame, the third conductor being electrically connected to the third winding to enable the third conductor to supply current to the third winding.

Clause 12. The rotary energy conversion device of any of clauses 1-8, further comprising: a second PCB armature configured to rotate about the axis of rotation and relative to the fixed frame, the second PCB armature including at least a second winding configured to generate third magnetic flux generally parallel to the axis of rotation; wherein: the at least one magnet assembly includes at least a first magnet assembly including a first back iron and a first set of permanent magnets, a second magnet assembly including a second back iron and a second set of permanent magnets, and a third magnet assembly including a third back iron and a third set of permanent magnets, the first PCB armature is disposed in first gap between the first set of permanent magnets and a first subset of the second set of permanent magnets on a first side of the second back iron, and the second PCB armature is disposed in second gap between the third set of permanent magnets and a second subset of the second set of permanent magnets on a second side of the second back iron opposite the first side.

Clause 13. The rotary energy conversion device of any of clauses 1-8, further comprising: a second PCB armature configured to rotate about the axis of rotation and relative to the fixed frame, independent of the first PCB armature, the second PCB armature including at least a second winding configured to generate third magnetic flux generally parallel to the axis of rotation and within the active region; and a second conductor in the fixed frame, the second conductor being electrically connected to the second winding to enable the second conductor to supply current to the second winding.

Clause 14. The rotary energy conversion device of any of clauses 1-13, wherein the first PCB armature is a PCB armature segment, wherein radial edges of the PCB armature segment subtend an angle of less than 360 degrees.

Clause 15. The rotary energy conversion device of any of clause 1-14, wherein the at least one magnet assembly includes a magnet assembly segment, wherein radial edges of the magnet assembly segment subtend an angle of less than 360 degrees.

Clause 16. The rotary energy conversion device of any of clause 1-15, further comprising: a housing supporting the first PCB armature and the at least one magnet assembly such that the first PCB armature is rotatable relative to the housing and the at least one magnet assembly is held stationary with respect to the housing.

Clause 17. An energy conversion device, comprising: at least a first magnet assembly in a fixed frame, the first magnet assembly including one or more first magnets configured to generate first magnetic flux within an active region; and at least first and second printed circuit board (PCB) armatures configured to be independently movable relative to the fixed frame, the first PCB armature including at least a first winding configured to generate second magnetic flux within the active region and the second PCB armature including at least a second winding configured to generate third magnetic flux within the active region.

Clause 18. The energy conversion device of clause 17, wherein: the one or more first magnets are configured and arranged so that the active region extends along at least a portion of an annulus; and the first and second PCB armatures are configured and arranged so that the first winding and the second winding can independently move in arcuate paths within the portion of the annulus.

Clause 19. The energy conversion device of clause 17 or clause 18, wherein the first and second PCB armatures are configured and arranged to rotate relative the fixed frame about an axis of rotation.

Clause 20. The energy conversion device of clause 19, wherein the first PCB armature includes a first PCB armature segment configured and arranged so that the first winding can move, relative to the fixed frame, in a first arcuate path about the axis of rotation, and wherein radial edges of the first PCB armature segment subtend an angle of less than 360 degrees about the axis of rotation.

Clause 21. The energy conversion device of clause 20, wherein the second PCB armature includes a second PCB armature segment configured and arranged so that the second winding can move, relative to the fixed frame, in a second arcuate path about the axis of rotation, and wherein radial edges of the second PCB armature segment subtend an angle of less than 360 degrees about the axis of rotation.

Clause 22. The energy conversion device of any of clauses 17-21, wherein the first magnet assembly includes a magnet assembly segment, wherein radial edges of the magnet assembly segment subtend an angle of less than 360 degrees.

Clause 23. The energy conversion device of any of clauses 17-22, wherein: the one or more first magnets are configured to generate first magnetic flux generally parallel to the axis of rotation; the first winding is configured and arranged to generate the second magnetic flux generally parallel to the axis of rotation; and the second winding is configured and arranged to generate the third magnetic flux generally parallel to the axis of rotation.

Clause 24. The energy conversion device of any of clauses 17-23, further comprising: at least first and second conductors in the fixed frame, the first conductor being electrically connected to the first winding to enable the first conductor to supply first current to the first winding to cause the first winding to generate the second magnetic flux, and the second conductor being electrically connected to the second winding to enable the second conductor to supply second current to the second winding to cause the second winding to generate the third magnetic flux.

Clause 25. The energy conversion device of clause 24, further comprising: at least one power electronic circuit in the fixed frame, the at least one power electronic circuit being (i) connected to the first conductor to supply the first current to the first conductor to cause the first winding to generate the second magnetic flux, and (ii) connected to the second conductor to supply the second current to the second conductor to cause the second winding to generate the third magnetic flux.

Clause 26. The energy conversion device of clause 24 or clause 25, further comprising: at least one slip ring assembly configured and arranged to electrically connect the first conductor and the second conductor to the first winding and the second winding, respectively, while the first and second PCB armatures rotate relative to the fixed frame.

Clause 27. The energy conversion device of clause 24 or clause 25, wherein the first conductor is a first cable that is directly connected to the first winding via a first terminal on the first PCB armature and the second conductor is a second cable that is directly connected to the second winding via a second terminal on the second PCB armature.

Clause 28. The energy conversion device of any of clauses 17-27, further comprising: a first hub component supporting the first PCB armature; a first bearing assembly mechanically connected to the first hub component to enable the first hub component to rotate relative to the fixed frame; a second hub component supporting the second PCB armature; and a second bearing assembly mechanically connected to the second hub component to enable the second hub component to rotate relative to the fixed frame.

Clause 28. The energy conversion device of clause 27, wherein: the first hub component includes a first torque arm configured to drive a first mechanical load; and the second hub component includes a second torque arm configured to drive a second mechanical load.

Clause 29. The energy conversion device of any of clauses 17-28, wherein: the first magnet assembly includes a first back iron and a first set of permanent magnets; the energy conversion device further comprises a second magnet assembly including a second back iron and a second set of permanent magnets, the second back iron being oriented generally parallel to the first back iron; and the first and second PCB armatures are disposed in a gap between the first set of permanent magnets and the second set of permanent magnets.

Clause 30. The energy conversion device of any of clauses 17-29, further comprising: a housing supporting the first and second PCB armatures and the first magnet assembly such that the first and second PCB armatures are independently movable relative to the housing and the first magnet assembly is held stationary with respect to the housing.

Clause 31. The energy conversion device of any of clauses 17-30, further comprising: a third PCB armature configured movable relative to the fixed frame, independently of the first and second PCB armatures, the third PCB armature including at least a third winding configured to generate fourth magnetic flux within the active region.

Clause 32. An energy conversion device, comprising: at least a first magnet assembly in a fixed frame, the first magnet assembly including first magnets configured to generate first magnetic flux within an active region that extends along at least a portion of an annulus; and a printed circuit board (PCB) armature segment including at least a first winding configured to generate second magnetic flux within the active region, wherein the PCB armature segment is configured and arranged so that the first winding can move, relative to the fixed frame, in an arcuate path about an axis of rotation, and wherein radial edges of the PCB armature segment subtend an angle of less than 360 degrees about the axis of rotation.

Clause 33. The energy conversion device of clause 32, wherein the PCB armature is configured and arranged to rotate relative to the fixed frame about an axis of rotation.

Clause 34. The energy conversion device of clause 32 or clause 33, wherein the first magnet assembly includes a magnet assembly segment, wherein radial edges of the magnet assembly segment subtend an angle of less than 360 degrees.

Clause 35. The energy conversion device of any of clauses 32-34, wherein: the first magnets are configured to generate first magnetic flux generally parallel to the axis of rotation; and the first winding is configured and arranged to generate the second magnetic flux generally parallel to the axis of rotation.

Clause 36. The energy conversion device of any of clauses 32-35, further comprising: at least a first conductor in the fixed frame, the first conductor being electrically connected to the first winding to enable the first conductor to supply first current to the first winding to cause the first winding to generate the second magnetic flux.

Clause 37. The energy conversion device of clause 36, further comprising: at least one power electronic circuit in the fixed frame, the at least one power electronic circuit being connected to the first conductor to supply the first current to the first conductor to cause the first winding to generate the second magnetic flux.

Clause 38. The energy conversion device of clause 36 or clause 37, further comprising: at least one slip ring assembly configured and arranged to electrically connect the first conductor to the first winding while the PCB armature rotates relative to the fixed frame.

Clause 39. The energy conversion device of clause 36 or clause 37, wherein the first conductor is a first cable that is directly connected to the first winding via a first terminal on the PCB armature.

Clause 40. The energy conversion device of any of clauses 32-39, further comprising: a hub component supporting the PCB armature; and a bearing assembly mechanically connected to the hub component to enable the hub component to rotate relative to the fixed frame.

Clause 41. The energy conversion device of clause 40, wherein: the hub component includes a torque arm configured to drive a mechanical load.

Clause 42. The energy conversion device of any of clauses 32-41, wherein: the first magnet assembly includes a first back iron and a first set of permanent magnets; the energy conversion device further comprises a second magnet assembly including a second back iron and a second set of permanent magnets, the second back iron being oriented generally parallel to the first back iron; and the PCB armature is disposed in a gap between the first set of permanent magnets and the second set of permanent magnets.

Clause 43. The energy conversion device of any of clauses 32-42, further comprising: a housing supporting the PCB armature and the first magnet assembly such that the PCB armature is movable relative to the housing and the first magnet assembly is held stationary with respect to the housing.

Clause 44. An energy conversion device, comprising: at least a first magnet assembly in a fixed frame, the first magnet assembly including first magnets configured to generate first magnetic flux within an active region that extends along at least a portion of an annulus; and at least a first printed circuit board (PCB) armature including at least a first winding configured to generate second magnetic flux within the active region, wherein the first PCB armature: is configured and arranged so that the first winding can move, relative to the fixed frame, in an arcuate path within the annulus; and includes at least one feature that extends radially outwardly from the annulus and is configured to enable attachment of a mechanical load so that the mechanical load can be driven by movement of the first PCB armature relative to the fixed frame.

Clause 45. The energy conversion device of clause 44, further comprising: a hub component supporting the first PCB armature; and a bearing assembly mechanically connected to the hub component to enable the hub component to rotate relative to the fixed frame.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An energy conversion device, comprising:
at least a first magnet assembly in a fixed frame, the first magnet assembly including first magnets configured to generate first magnetic flux within an active region that extends along at least a portion of an annulus; and
a first printed circuit board (PCB) armature segment including at least a first winding configured to generate second magnetic flux within the active region, wherein:
the first PCB armature segment is configured and arranged so that the first winding can move, relative to the fixed frame, in an arcuate path about an axis of rotation;
radial edges of the first PCB armature segment subtend an angle of less than 360 degrees about the axis of rotation; and
a portion of the first PCB armature segment that extends radially outwardly of the portion of the annulus is attached to a mechanical load so that the mechanical load can be driven by movement of the first PCB armature segment relative to the fixed frame.

2. The energy conversion device of claim 1, wherein the first PCB armature segment is configured and arranged to rotate relative to the fixed frame about the axis of rotation.

3. The energy conversion device of claim 2, wherein the first magnet assembly includes a magnet assembly segment, wherein radial edges of the magnet assembly segment subtend an angle of less than 360 degrees.

4. The energy conversion device of claim 2, wherein:
the first magnets are configured to generate the first magnetic flux generally parallel to the axis of rotation; and
the first winding is configured and arranged to generate the second magnetic flux generally parallel to the axis of rotation.

5. The energy conversion device of claim 1, further comprising:
at least a first conductor in the fixed frame, the first conductor being electrically connected to the first winding to enable the first conductor to supply first current to the first winding to cause the first winding to generate the second magnetic flux.

6. The energy conversion device of claim 5, further comprising:
at least one power electronic circuit in the fixed frame, the at least one power electronic circuit being connected to the first conductor to supply the first current to the first conductor to cause the first winding to generate the second magnetic flux.

7. The energy conversion device of claim 5, further comprising:
at least one slip ring assembly configured and arranged to electrically connect the first conductor to the first winding while the first PCB armature segment rotates relative to the fixed frame.

8. The energy conversion device of claim 5, wherein the first conductor is a first cable that is directly connected to the first winding via a first terminal on the first PCB armature segment.

9. The energy conversion device of claim 1, further comprising:
a hub component supporting the first PCB armature segment; and
a bearing assembly mechanically connected to the hub component to enable the hub component to rotate relative to the fixed frame.

10. The energy conversion device of claim 1, wherein:
the first magnet assembly includes a first back iron and a first set of permanent magnets;
the energy conversion device further comprises a second magnet assembly including a second back iron and a second set of permanent magnets, the second back iron being oriented generally parallel to the first back iron; and
the first PCB armature segment is disposed in a gap between the first set of permanent magnets and the second set of permanent magnets.

11. The energy conversion device of claim 1, further comprising:
a housing supporting the first PCB armature segment and the first magnet assembly such that the first PCB armature segment is movable relative to the housing and the first magnet assembly is held stationary with respect to the housing.

12. The energy conversion device of claim 1, further comprising:
a second PCB armature segment configured to be independently movable relative to the first PCB armature segment and the fixed frame, the second PCB armature segment including at least a third winding configured to generate third magnetic flux within the active region, wherein radial edges of the second PCB armature segment subtend an angle of less than 360 degrees about the axis of rotation.

13. The energy conversion device of claim 12, wherein:
the first magnet assembly includes a first back iron and a first set of permanent magnets;
the energy conversion device further comprises a second magnet assembly including a second back iron and a second set of permanent magnets, the second back iron being oriented generally parallel to the first back iron; and
the first PCB armature segment and the second PCB armature segment are disposed in a same air gap between the first set of permanent magnets and the second set of permanent magnets.

14. A method for operating an energy conversion device, the energy conversion device including at least a first magnet assembly having first magnets configured to generate first magnetic flux within an active region that extends along at least a portion of an annulus, and a first printed circuit board (PCB) armature segment having at least a first winding configured to generate second magnetic flux within the active region, wherein radial edges of the first PCB armature segment subtend an angle of less than 360 degrees about an axis of rotation and a portion of the first PCB armature segment that extends radially outwardly of the portion of the annulus is attached to a mechanical load, the method comprising:

while the first magnet assembly is stationary with respect to a fixed frame, energizing the first winding to cause the first PCB armature segment to move, relative to the first magnet assembly, in an arcuate path about the axis of rotation so that the mechanical load is driven by movement of the first PCB armature segment relative to the fixed frame.

15. The method of claim 14, wherein energizing the first winding causes the first PCB armature segment to rotate about the axis of rotation.

16. The method of claim 14, wherein the first magnet assembly includes a magnet assembly segment, wherein radial edges of the magnet assembly segment subtend an angle of less than 360 degrees.

17. The method of claim 14, further comprising:

the first magnets are configured to generate the first magnetic flux generally parallel to the axis of rotation; and the first winding is configured and arranged to generate the second magnetic flux generally parallel to the axis of rotation.

18. The method of claim 14, further comprising:

supplying first current to at least a first conductor in the fixed frame, the first conductor being electrically connected to the first winding to cause the first winding to generate the second magnetic flux.

19. The method of claim 18, wherein supplying the first current to the first conductor includes:

operating at least one power electronic circuit in the fixed frame to supply the first current to the first conductor to cause the first winding to generate the second magnetic flux.

20. The method of claim 19, wherein the energy conversion device further includes at least one slip ring assembly that electrically connects the first conductor to the first winding while the first PCB armature segment moves relative to the first magnet assembly.

21. The method of claim 19, wherein the first conductor is a first cable that is directly connected to the first winding via a first terminal on the first PCB armature segment.

22. The method of claim 14, wherein the energy conversion device further includes:

a hub component supporting the first PCB armature segment; and a bearing assembly mechanically connected to the hub component to enable the hub component to rotate relative to the first magnet assembly.

23. The method of claim 14, wherein:

the first magnet assembly includes a first back iron and a first set of permanent magnets;

the energy conversion device further comprises a second magnet assembly including a second back iron and a second set of permanent magnets, the second back iron being oriented generally parallel to the first back iron; and the first PCB armature segment is disposed in a gap between the first set of permanent magnets and the second set of permanent magnets.

24. The method of claim 14, wherein the energy conversion device further includes:

a housing supporting the first PCB armature segment and the first magnet assembly such that the first PCB armature segment is movable relative to the housing and the first magnet assembly is held stationary with respect to the housing.

25. The method of claim 14, wherein the energy conversion device further includes a second PCB armature segment including at least a second winding configured to generate third magnetic flux within the active region, wherein radial edges of the second PCB armature segment subtend an angle of less than 360 degrees about the axis of rotation, and the method further comprises:

while the first magnet assembly is stationary with respect to the fixed frame, energizing the second winding to cause the second PCB armature segment to move, relative the first magnet assembly and independent of the first PCB armature segment, in an arcuate path about an axis of rotation.

26. The method of claim 25, wherein:

the first magnet assembly includes a first back iron and a first set of permanent magnets;

the energy conversion device further comprises a second magnet assembly including a second back iron and a second set of permanent magnets, the second back iron being oriented generally parallel to the first back iron; and the first PCB armature segment and the second PCB armature segment are disposed in a same air gap between the first set of permanent magnets and the second set of permanent magnets.

* * * * *